Aug. 1, 1972    J. F. REILLY, JR., ET AL    3,681,123
METHOD AND APPARATUS FOR MANUFACTURING CANDLES
Filed Aug. 10, 1970    5 Sheets-Sheet 1
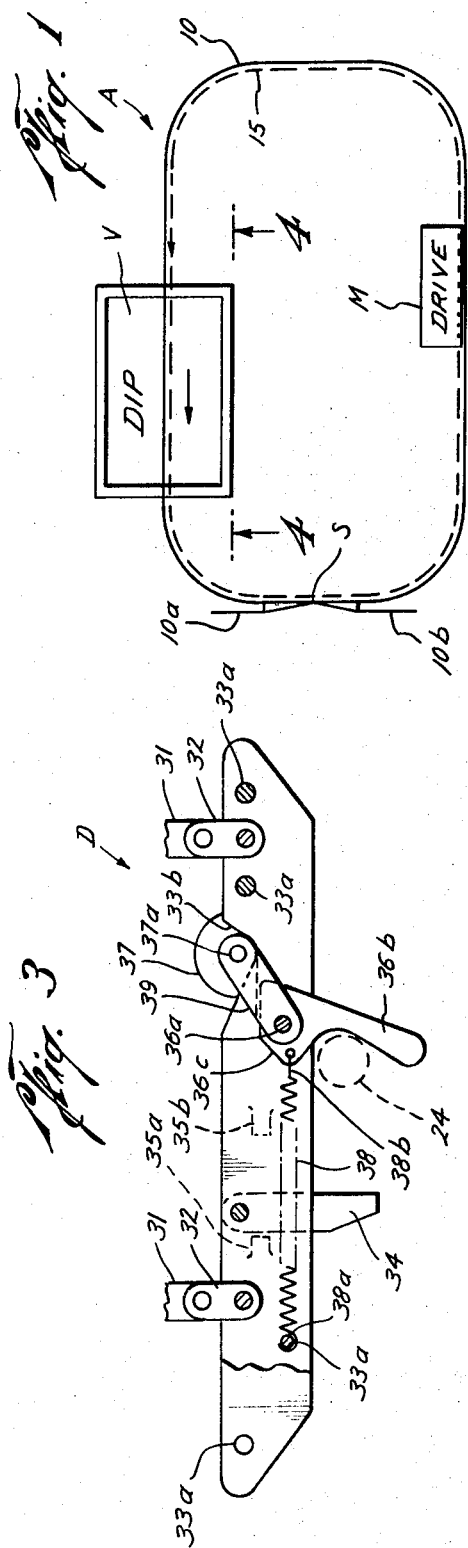
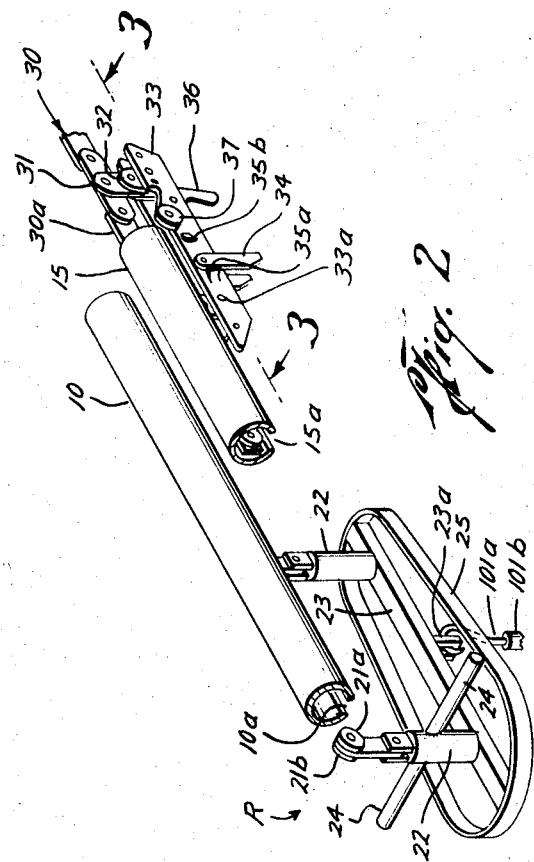
Joseph F. Reilly, Jr.
Joseph D. Daigle
Daniel W. Hubenak, Jr.
    INVENTORS
BY
Pravel Wilson & Matthews
    ATTORNEYS

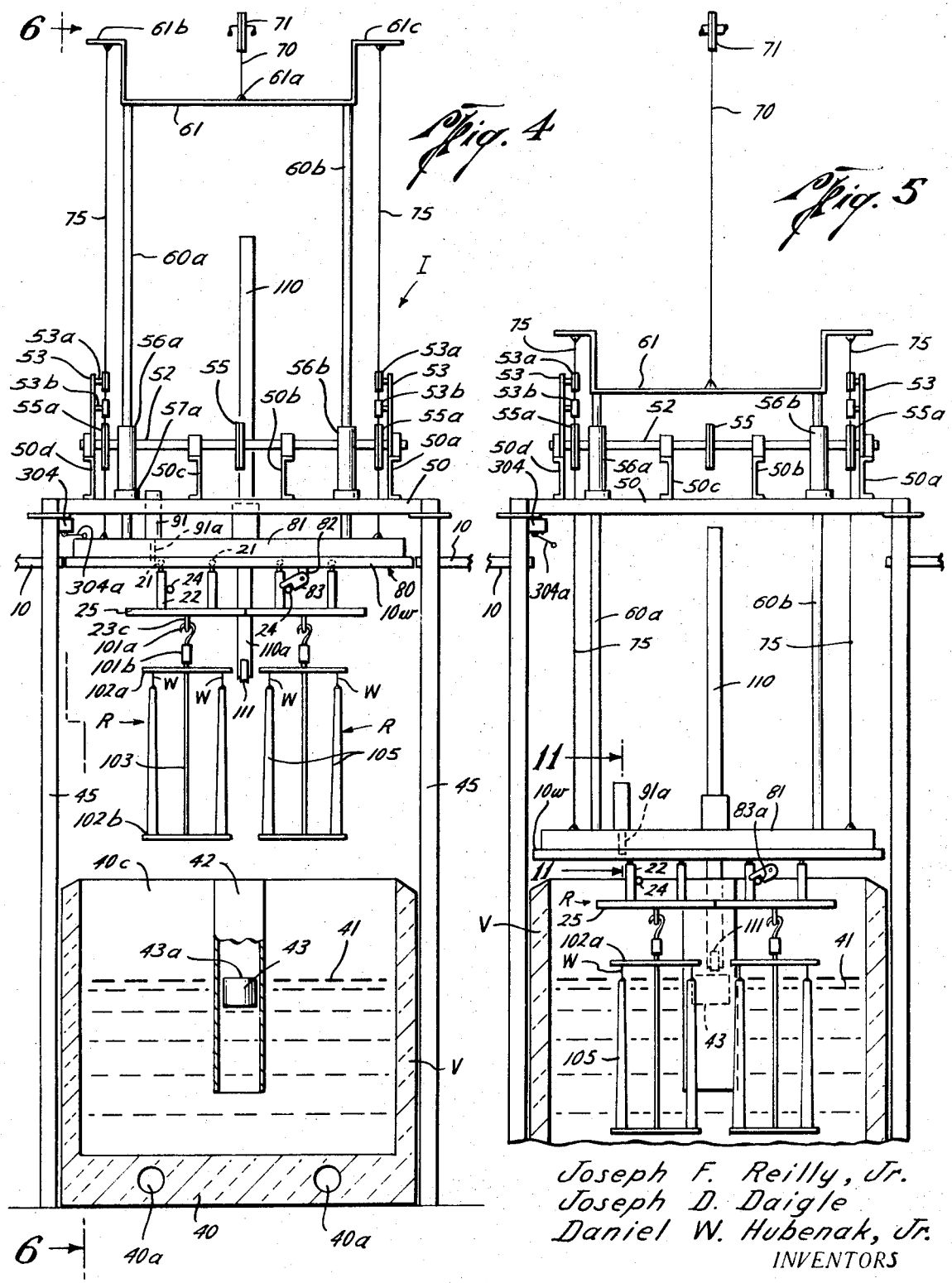

Aug. 1, 1972  J. F. REILLY, JR., ET AL  3,681,123
METHOD AND APPARATUS FOR MANUFACTURING CANDLES
Filed Aug. 10, 1970  5 Sheets-Sheet 3
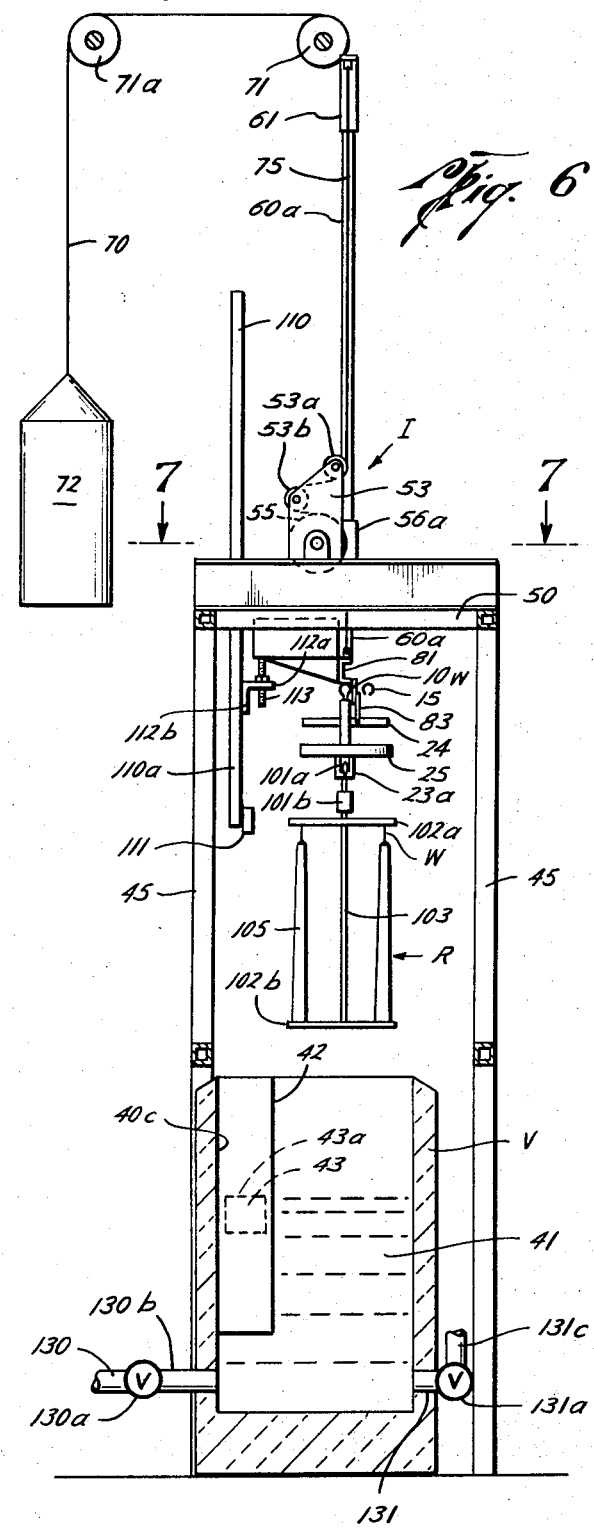
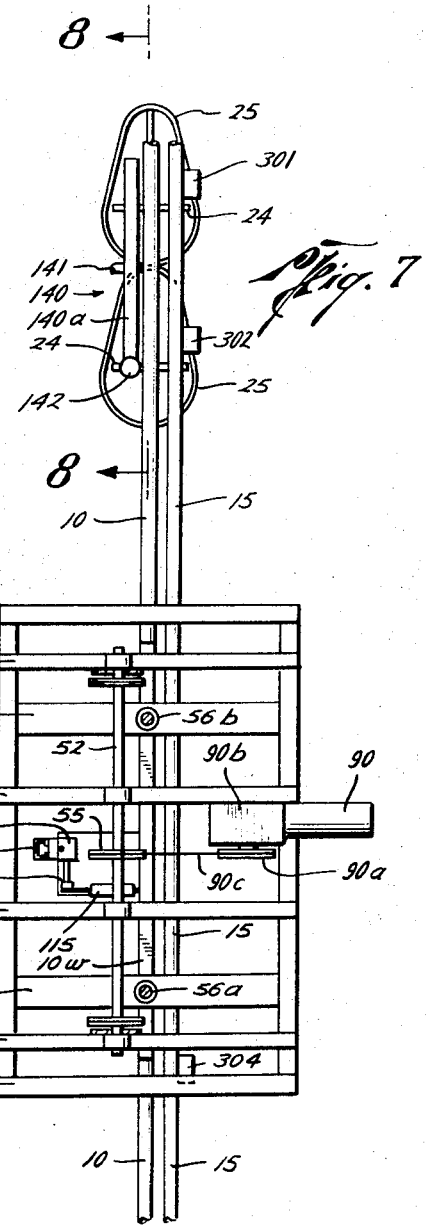
Joseph F. Reilly, Jr.
Joseph D. Daigle
Daniel W. Hubenak, Jr.
INVENTORS
BY
Pravel, Wilson & Matthews
ATTORNEYS

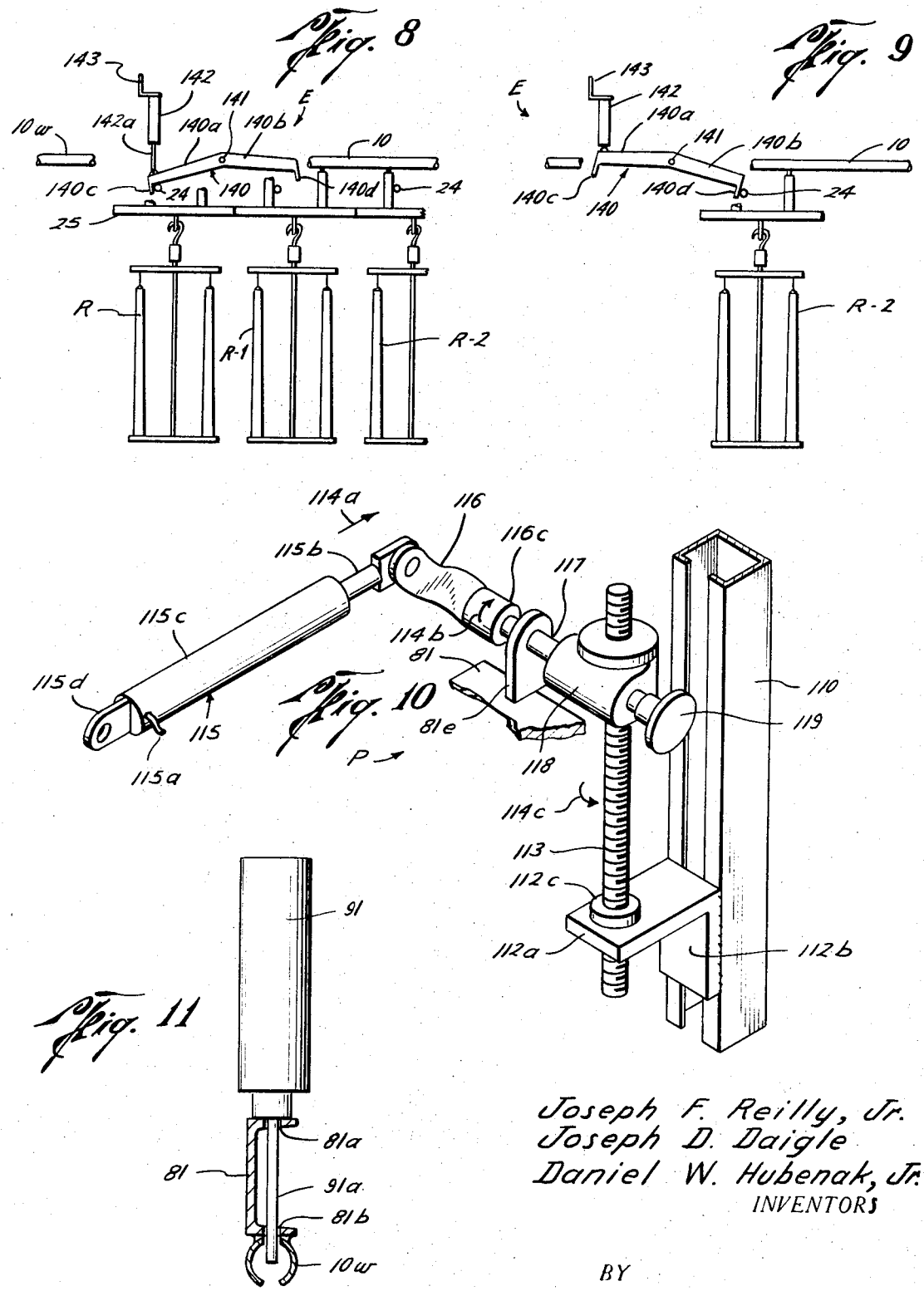

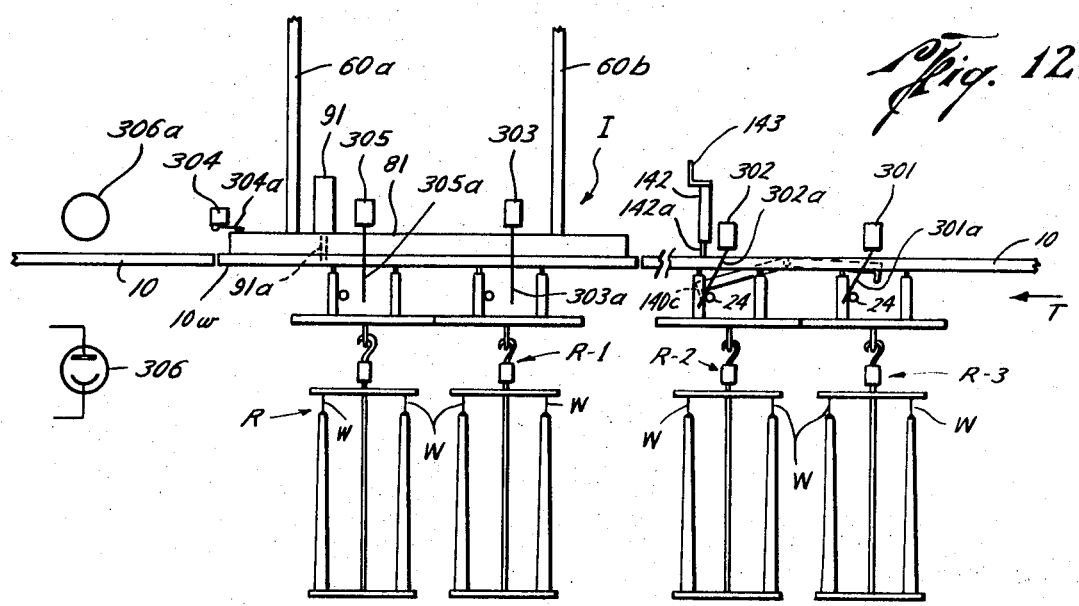
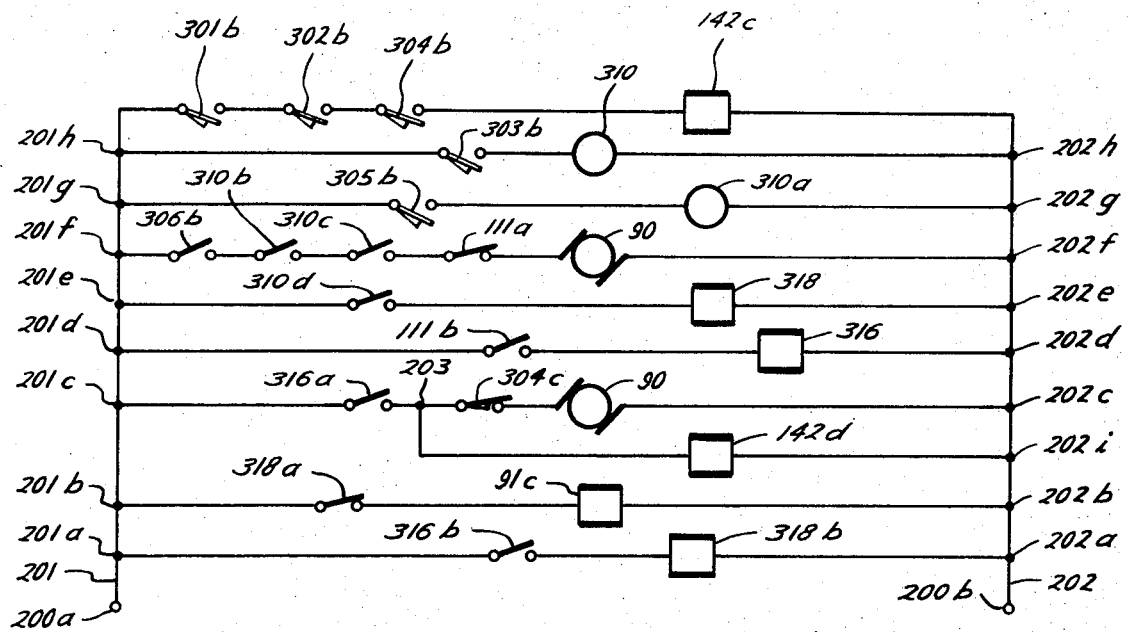
Joseph F. Reilly, Jr.
Joseph D. Daigle
Daniel W. Hubenak, Jr.
INVENTORS
BY
Pravel Wilson & Matthews
ATTORNEYS

United States Patent Office 3,681,123
Patented Aug. 1, 1972

3,681,123
METHOD AND APPARATUS FOR MANUFACTURING CANDLES
Joseph F. Reilly, Jr., Joseph D. Daigle, and Daniel W. Hubenak, Jr., Harris County, Tex., assignors to Faroy, Inc.
Filed Aug. 10, 1970, Ser. No. 62,341
Int. Cl. B44d 1/06; C11c 5/02
U.S. Cl. 117—121.2
19 Claims

ABSTRACT OF THE DISCLOSURE

A machine and method for automatically making candles wherein a plurality of racks each containing the wicks of the candles to be formed are mounted on a circulating overhead conveyor system which cyclically and sequentially dips the racks into a vat of molten wax and then transports the racks along the conveyor system, allowing the applied molten wax to cool and solidify before the next dip cycle. The machine contains apparatus to automatically perform the dip cycle, including means to insure that the racks of wicks are properly positioned for the dip cycle, means for adjusting the depth of immersion of the wick racks into the molten wax, and means for insuring that the wick racks are inserted the proper depth into the molten wax.

BACKGROUND OF THE INVENTION

The field of the present invention is machines and methods for manufacturing candles.

So far as is known, no satisfactory prior art machinery for automatically making candles by dipping wicks in molten wax has been developed, and consequently, the manufacture of candles was previously accomplished manually. Such manual manufacture was thus tedious, inefficient and time-consuming. Manual manufacture of the candles was also unsatisfactory in terms of safety, due to the close proximity of the workers to the heated molten wax.

SUMMARY OF THE INVENTION

With the method and apparatus of the present invention, relatively large quantities of candles are safely produced in a given time as compared to the prior manual manufacture. The method and apparatus involves automatic candle-making wherein a plurality of racks of wicks are transported, preferably on an overhead conveyor system, and are cyclically and sequentially dipped into a vat of molten wax. In its specific form, the apparatus includes means to insure that the racks are properly positioned before dipping, means to insert the racks the proper depth into the molten wax for each cycle, means to adjust the amount of immersion as the candle making process progresses through successive stages, and means for sensing that the racks have been inserted the proper depth into the molten wax.

BRIEF DESCRIPTION OF THE DRAWINGS

FIG. 1 is a plan view which schematically shows a conveyor system arranged with an automatic candle-making apparatus according to the present invention;

FIG. 2 is an isometric view of a portion of the overhead conveyor system and candle rack holding device of the apparatus of the present invention;

FIG. 3 is a view, partly in section, taken along lines 3—3 of FIG. 2;

FIG. 4 is an elevation, partly in section, taken along lines 4—4 of FIG. 1;

FIG. 5 is a view similar to FIG. 4, but with the apparatus in a different position than in FIG. 4;

FIG. 6 is a side view taken along lines 6—6 of FIG. 4;

FIG. 7 is a plan view, partly in section, taken along lines 7—7 of FIG. 6;

FIG. 8 is a partial view, schematic in part, taken along lines 8—8 of FIG. 7;

FIG. 9 is a view of a portion of the apparatus of FIG. 8, illustrating a different position from that of FIG. 8 during the operation of the present invention;

FIG. 10 is an isometric view of the immersion level adjusting means of the present invention;

FIG. 11 is a view taken along lines 11—11 of FIG. 5;

FIG. 12 is a diagrammatic representation of a portion of the apparatus to illustrate the operation thereof; and FIG. 12A is a schematic electrical circuit diagram of a portion of an electrical control circuit for the apparatus of the present invention.

DESCRIPTION OF THE PREFERRED EMBODIMENT

In the drawings, the letter A designates generally an apparatus for automatically manufacturing candles wherein a plurality of racks R, each holding plural wicks W about which the candles are to be formed, are transported by an overhead conveyor system C. One or more, preferably two, of such racks R are cyclically and sequentially dipped into a vat of molten wax V and are thereafter transported away from such vat by the conveyor system for a sufficient time to allow the recently applied molten wax to cool and solidify before the next dip cycle, whereby as the dipping and cooling is repeated cyclically, a candle forms about the wick.

Considering the invention more in detail, the overhead carrier conveyor system C is of any conventional construction and the portion illustrated includes an overhead carrier conveyor track 10 (solid line) and an overhead driving track 15 (dotted line) which are parallel to each other in part of their paths and divergent from each other in the remainder, as will be evident from FIG. 1, and from the further description hereinafter. A vat V of molten wax is positioned along the path of the overhead carrier conveyor system C, and, as will be later explained, the racks R are moved along the conveyor track 10 by a conveyor driving chain mechanism 30 which moves in the track 15. The carrier conveyor system C has a conveyor track-changing switch S of conventional construction so that racks R with empty wicks W may be fed onto the oval portion of the track 10 at 10a and may be removed therefrom at 10b when candles have been formed. Normally, the switch S is inactive so that a plurality of racks R go around in the oval path of the tracks 10 and 15 shown in FIG. 1, or in any other desired path. The driving chain mechanism 30 is preferably an endless chain which is continuously driven by a drive means M (FIG. 1) which conventionally includes a motor, sprockets and other mechanism (not shown). The driving chain 30 is thus moved in the track 15 and carries a plurality of longitudinally spaced drive members D, each of which is adapted to engage and move one of the racks R therewith, but with the racks R movable in the track 10, as will be more evident hereinafter. To accomplish the dipping of one or more of such racks R into the vat V, while the chain mechanism 30 continues to move in its path, means are provided for the drive members D to trip and move past the racks R when in predetermined positions relative to the vat V, as will be explained.

Referring now to FIG. 2 in particular, the overhead track 10 preferably is a tubing in which a longitudinal slot 10a is formed. The track 15 is preferably also a tubing having a longitudinal slot 15a therein. Each carrier rack R is mounted for travel in the carrier conveyor track 10 by means of a plurality of wheels or rollers 21a (FIG. 2) which are rotatably mounted on a vertical support member 21b. The vertical support members 21b are pivotally connected to posts 22 on a longitudinal brace member 23 situated substantially parallel to the longitudinal axis of the track 10. Transverse driving bars 24 are welded or are otherwise affixed to one post 22 so as to extend substantially perpendicular to the longitudinal track 10, for purposes to be later discussed. A bumper or rail 25 is secured to the brace member 23 to sometimes control the movements of each rack R with respect to adjacent racks R and to allow manual movement of the racks R during loading, unloading or as otherwise desired.

A bracket 23a is attached to the brace member 23, and has an eyelet formed therein for receiving a hanging hook 101a which is mounted with respect to a hanging rod 101b of each rack R.

The drive conveyor track 15 is a tubing in which a longitudinal slot 15a is formed, enclosing the drive chain 30 or other suitable link belt (FIG. 2) which normally has a plurality of pivotally connected link members 30a. Each driving member D is mounted with respect to the chain 30 by any suitable means such as links 31 and 32.

Each drive member D (FIG. 3) comprises two rail members 33, extending longitudinally beneath the track 15 and held separated with respect to each other by a plurality of spacers 33a.

A holding dog 34 is pivotally mounted on the outer surface of each of the rail members 33 for pivotal movement rearwardly from the position shown in FIG. 3. A first raised stop 35a in the outer surface of the rail member 33 prevents pivotal movement of the holding dog 34 forwardly from its FIG. 3 position and a second stop 35b limits the extent of rearward pivoting thereof.

A driving dog 36 is positioned in the space between the rail members 33 on a pivot pin 36g which also has mounted thereto through links 39 a plurality of locking and stabilizing rollers 37 which are positioned outside the rail members 33. A notch 33b is formed in each member 33 for accommodating the pin 37a connecting the rollers 37.

The driving dog 36 has a lower driving arm 36b which is adapted to engage one of the rods 24 for moving each rack R. A tensioned spring 38 is affixed at an end 38a to a suitable spacing bar 33a and at an end 38b to a connecting arm 36c of the driving dog 36, insuring that the driving dog 36 is resiliently held in the position of FIG. 3 so that the driving arm 36b normally engages one of the rods 24, but is pivotable under certain conditions, as will be explained.

Referring now to FIGS. 4–12 in particular, an immersing or dipping apparatus I for selectively dipping two racks R into the vat V of molten wax 41 is shown. The vat V itself may be of any desired construction, but preferably a plurality of heating ducts or conduits 40a are formed in a base member 40 to supply heat to the molten wax 41 contained in the vat V. A sleeve 42 is attached to the inside of a wall 40c of the vat V for receiving a float 43 therein. The float 43 is preferably hollow and made of galvanized metal so that it floats with its top surface 43a substantially adjacent the upper surface of the molten wax 41, for reasons to be later discussed.

Although the vat V may be filled and emptied by any suitable apparatus or technique, the drawings (FIG. 6) illustrate a pipe 130, leading to a storage vat (not shown), an inlet valve 130a, and an inlet pipe 130b, which allow filling of the vat V or the addition of wax 41 thereto by pumping or other suitable techniques, and an outlet pipe 131, an outlet valve 131a and a pipe 131c which allow removal of wax 41 from the vat V.

The dipping means I is mounted with respect to an open rectangular horizontal support frame 50 atop a plurality of vertical support beams 45. The support frame 50 has a plurality of channel members or other mounting plates 50a, 50b, 50c and 50d mounted on the support frame 50, on each of which is mounted a bearing for supporting a rotatable shaft 52. A plurality of pulleys 55 and 55a are rotatably mounted on the shaft 52.

A pair of guide sleeves 56a and 56b (FIG. 4) are mounted on horizontal support members 57a and 57b which are welded or are otherwise connected to the upper frame 50 (FIG. 7). Vertically aligned apertures are formed in such sleeves and support members to receive and guide vertically movable transport rods 60a and 60b. A bridle 61 is connected to the upper ends of the rods 60a and 60b, which bridle has an eyelet 61a for the attachment of a cable 70 which passes over pulleys 71 and 71a (FIG. 6) and to which a counterweight 72 is attached.

The outer ends 61b and 61c of the bridle 61 are attached to suitable cables 75 or similar supports. Each cable 75 engages pulleys 53a and 53b mounted on a plate 53, and also pulley 55a on the shaft 52 to establish a driving engagement between the cable 75 and the pulley 55a. The lower end of each cable 75 is attached to a support member 81 of an immersion unit 80.

The movable transport rods 60a and 60b are connected to the support member 81 for moving the immersion unit 80 up and down relative to the vat V. The immersion unit 80 includes a section 10w of the track 10 which is welded or otherwise secured to the member 81 for vertical movement therewith from a position in normal alignment with the rest of the track 10 (FIG. 4) to a lowered position (FIG. 5).

For controlling the raising and lowering of the immersion unit 80, an immersion motor 90 (FIG. 7), which is preferably a direct current electric motor for the purposes of more effectively controlling the rate of immersion, is mounted on the support frame 50, and drives a pulley 90a through a gear box 90b which engages a suitable drive chain or belt 90c. The chain or belt 90c drives the pulley 55 to thereby rotate the shaft 52, the pulleys 55a therewith, and to thereby either lower or raise the cables 75 for raising and lowering the unit 80 and the racks R therewith. A solenoid-operated stop 91 (FIGS. 4, 5 and 11) with a stop rod or bar 91a, is mounted on the support member 81 at suitable apertures 81a and 81b in the support member 81 for vertically moving the rod 91a into and out of the bore of the section 10w in order to prevent forward movement of the racks R during immersion.

In the form of the invention illustrated, the movable track section 10w is of a length to hold two of the racks R, as illustrated, but that length may vary and the number of racks R supported in the movable track section 10w may also vary.

A lug 82 on frame 81 (FIGS. 4, 5 and 6) extends downwardly and has a dog 83 pivotally mounted thereon. The dog 83 has a notch 83a therein (FIGS. 4 and 5) for engagement with a driving rod 24 of a rack R to be immersed in order to prevent rearward movement of the rack R during immersion, as will be more evident hereinafter.

As will be more evident from the description of the operation, the stop rod 91a of the locking means 91 engages the roller 21 of the forward rack R to be lowered (FIG.

4), and the dog 83 engages the driving bar 24 of the rear rack R to be lowered (FIGS. 4 and 5) to limit longitudinal movement of the racks R relative to the track section 10w during the raising and lowering thereof.

A level sensing means 111 senses the proximity of float 43, and may be, for example, a metallic body sensing microswitch, such as Honeywell detector, Model No. 11FB42. The level sensing means 111 is mounted at a lower end 110a of a vertical sensing means support 110, which also serves as a conduit for the electrical conductors (not shown) leading from the level sensing means 111 to the electrical control circuit to be later discussed.

The level sensing means 111 is mounted to a lower end 110a of the support 110 at an elevation to insure that the upper ends of the candles 105 are immersed the desired depth into the molten wax 41 during the dipping cycle to be later discussed before sensing the proximity of the upper surface 43a of the float 43 which is substantially at the surface of the molten wax 41.

When the candle making apparatus A is producing candles, the level of immersion of the wicks W and the racks R is periodically adjusted by adjustment of the elevation of the level sensing means 111 with respect to the candles 105.

Referring to FIG. 10, the means P to periodically adjust the position of the level sensing means 111 with respect to the candles 105 is shown, comprising an actuating assembly 115, preferably pneumatic, with a suitable hose 115a mounted thereto which actuates such assembly.

The cylinder 115c of the assembly 115 is connected through an attaching bracket 115d or other suitable means to the support member 81.

The assembly 115 is actuated by means of air or fluid supplied through the hose 115a under control of a counter 310 in the electrical control circuit to be discussed later. The counter 310 actuates an electrical circuit (not shown) which energizes a pump or other means to supply the air or fluid through the hose 115a.

The means for supplying the air or fluid to the assembly 115 could also be manually actuated. Each actuation of the assembly 115 causes a thrusting movement of the piston rod 115b in the direction of an arrow 114a, after which the rod 115b returns to its original position within assembly 115, by internal spring (not shown) or other suitable means.

The rod 115b is pivotally mounted to an arm 116 of a ratchet 116c. The ratchet 116c is axially mounted to a rod 117 and upon each thrust of the rod 115b causes a unidirectional advance of the rod 117 in the direction of the arrow 114b.

The rod 117 is rotatably mounted to a flange 81e of the support member 81, and engages suitable gears within a gear box 118. The gears within the gear box 118 translate the rotational movement of the rod 117 in the direction 114b into a rotational movement of the threaded member 113 in the direction indicated by an arrow 114c. A sleeve 112c of the arm 112a of angle iron member 112, threadedly engaged to the threaded member 113, causes the rotational movement of the threaded member 113 to adjust the position of support 110, and consequently the level sensing means 111, with respect to the support member 81, the racks R and the wicks W.

A manual actuating knob 119 is also provided, in order to allow for manual adjustment of the position of the support member 110 and its associated level sensing means 111 with respect to the support member 81 of the immersion means I. The manual actuating knob 119 is connected through suitable gears to translate rotational movement of such knob in either the direction of the arrow 114b, or the opposite direction, into suitable rotational movement of the threaded member 113.

Each rack R (FIGS. 4, 5 and 6) includes the hanging hook 101a and hanging rod 101b, an upper wick frame 102a, a frame spacing support 103, and a lower wick frame 102b. The wicks W are mounted to, and strung between, the frames 102a and 102b.

During the operation of the immersion means I, the racks R which are not being immersed are prevented from moving into a position interfering with such operation by an escapement means E (FIGS. 8, 9 and 12). A portion of the track 10 has been removed in the drawings to show the escapement means E which would otherwise not be fully visible.

A solenoid 142 is mounted to a suitable fixed support 143. An operating arm 142a of the solenoid is pivotally connected to a first arm 140a of an escapement 140.

The escapement 140 is pivotally mounted to an axle 141, and the first arm 140a and a second arm 140b thereof extend outwardly from the axle 141. A pair of blocking arms or dogs 140c and 140d extend downwardly from the arm 140a, and 140b, respectively.

The solenoid 142 has two operative positions, in the first of which (FIG. 8), the operating arm 142a is forced downwardly, driving the arm 140a downwardly to a position where the blocking dog 140c engages the driving bar 24 of the forward rack R therebelow, preventing further movement of such rack R and all subsequent racks along the track 10. The length of the escapement 140 is such that the number of racks R blocked by the dog 140c and mounted on the track 10 between the dogs 140c and 140d equals the number of racks R mounted on the movable track 10w during each immersion operation, in this embodiment, two.

In the second operated position of solenoid 142 (FIG. 9), the operating arm 142a is drawn upwardly by the solenoid 142, simultaneously raising the arm 140a to a position where the dog 140c can no longer engage the driving bars 24 of the number of racks R next to be immersed, and lowering the arm 140b to a position where the blocking dog 140d engages the driving bar 24 of the subsequent rack R-2.

A plurality of electrical control wsitches 301 and 302 (FIGS. 7 and 12) are mounted to or near the track 10 preceding the movable track section 10w, with their associated actuating arms 301a and 302a, respectively, engageable with the bars 24 of the racks R passing beneath such switches.

A plurality of electrical control switches 303 and 305 (FIG. 12) are mounted with the immersion means I, with their associated actuating arms 303a and 305a, respectively, engageable by the driving bars 24 of the racks R passing beneath such switches. A control switch 304 with associated actuating arm 304a is mounted to the frame 50 (FIGS. 4, 5 and 12). The arm 304a is engaged by the support member 81 when the immersion means I is in the position of normal alignment (FIG. 4).

A photoelectric cell 306, and its associated reflective plate 306a are shown schematically 90° from their actual positions in FIG. 12. The photoelectric cell 306 and reflective plate 306a are mounted to suitable support means (not shown) at a position slightly past the movable track section 10w in the direction of travel of the racks R at substantially the same elevation with respect to the track 10, as the bumpers 25 of the racks R, so that the presence of a rack R along the track 10 at this position interrupts the photoelectric circuit between the photoelectric cell 306 and the reflector 306a, for control purposes to be later discussed.

In FIG. 12a an illustrative electrical control circuit which makes the operation of the candle making apparatus A automatic is shown. A plurality of terminals 200a and 200b receive electrical power from a suitable electric power source (not shown). An electrical conductor 201 connects the terminal 200a to a plurality of terminals 201a, 201b, 201c, 201d, 201e, 201f, 201g, and 201h. An electrical conductor 202 connects the terminal 200b to a plurality of terminals 202a, 202b, 202c, 202d, 202e, 202f, 202g, 202h, and 202i. A normally open contact 301b of the electrical switch 301, a normally open contact 302b of the electrical switch 302, a normally open contact 304b of the electrical control switch 304 and the coil 142c of the solenoid 142 are serially electrically connected between the terminals 201h and 202h. The coil 142c when energized operates solenoid 142 to its second operative position raising the arm 140a to an elevated position (FIG. 9). A normally open contact 303b of electrical control switch 303 and a suitable electrical counter 310, which may for instance be of the type manufactured as the "Bliss-Eagle Signal, Model H–Z 172" are also electrically connected in a serial electrical circuit between the terminal 201h and the terminal 202h.

A normally open contact 305b of the electrical control switch 305 and a suitable electrical counter 310a, which may for instance be a portion of the counter 310, are serially electrically connected between the terminals 201g and 202g.

A contact 306b, which is open if the photoelectric circuit between the photoelectric cell 306 and the reflector plate 306a is interrupted, a normally open electrical contact 310b of the counter 310 which closes upon the count of two, that is, after the counter 310 has actuated twice, a similar contact 310c of the counter 310a which closes after each actuation of the counter 310a, a normally closed contact 111a of the level sensor 111 which opens when the level sensor 111 is actuated by proximity to the float 43 as previously discussed, and the immersion motor 90, are serially electrically connected between the terminals 201f and 202f. The motor 90 is connected in this portion of the control circuit to provide downward movement of the immersion means I when energized.

A normally open contact 310d of the counter 310a, which closes upon a count of one by counter 310a, and a relay 318, which when operated raises the stopping bar 91a of solenoid 91, are electrically connected between the terminals 201e and 202e.

A normally open contact 111b of the level sensor 111, which closes upon proximity of the level sensor 111 to the float 43, and a time delay relay 316 which operates only upon passage of a suitable period of time after being energized, are serially electrically connected between the terminals 201d and 202d. A normally open contact 316a of the time delay relay 316 is electrically connected between the terminal 201c and a terminal 203. A normally closed contact 304c of the electrical control switch 304 and the immersion motor 90 are serially electrically connected between the terminal 203 and the terminal 202c. The connections to the immersion motor 90 are reversed in this circuit from those of the connections between the terminals 201f and 202f previously discussed, so that upon closure of the contacts 316a and 304c the immersion motor 90 operates to raise the immersion means I from the level of the vat of molten wax. A relay 142d of the solenoid 142, which operates the solenoid 142a to its first operative position, pivoting the rear arm 140b upwardly so that dog 140c mounted to the arm 140a is in the blocking position (FIG. 8), is electrically connected between the terminal 203 and terminal 202i. A normally closed contact 318a which closes when energized by relay 318 and opens when energized by relay 318b, and a coil 91c of the stop solenoid 91 are electrically connected between the terminals 201b and 202b. The coil 91c when energized moves the stop rod 91a upwardly from the blocking position (FIG. 11) and allows movement of the racks R from the track section 10w to the left onto the track 10. The relay 318b and a normally open contact 316b of the time delay relay 16 are serially connected between the terminals 201a and 202a.

OPERATION OF THE INVENTION

In the operation of the present invention the desired number of racks R, usually twelve, are switched on to the illustrated oval portion of the track 10 at the switch S, or are otherwise suitably positioned on the track 10.

Each rack R is pushed along the track 10 by a drive member D, and two such racks are ultimately pushed to the movable track section 10w for each immersion cycle under control of the escapement means E and the control circuitry. The remaining racks R on the track 10 are driven by the driving members D or they are held by the escapement E so as to form a queue awaiting completion of the immersion cycle on the removable track section 10w.

During the time the racks R are being circulated along the track 10, awaiting their turn for the next immersion cycle, the molten wax 41 which was picked up in their prior immersion cycle will cool and solidify, to add a new layer of wax to the candle being formed.

As two racks R are being lowered by the dipping means I into the vat V, the solenoid 142 of the escapement means E is in its first operative position (FIG. 8) causing the dog 140c to engage the driving bar 24 of the forward rack R and hold such rack stationary with respect to the track 10. The driving dog 36 of the driving member D which moved the rack R into position is tripped rearwardly by the stationary driving bar 24 and passes over such stationary driving bar, allowing continued movement of the driving members D along the driving track 15.

Additional driving members D move the other circulating racks, such as R–1 and R–2, along the track 10 until their respective bumpers 25 engage the bumpers 25 of the rack R being held stationary by the escapement E, and such other circulating racks become stationary, forming a queue awaiting immersion. The driving dogs 36 of the additional driving members D are also tripped rearwardly by the driving bars 24 of the rack R and pass over such driving bars 24 to allow continued movement of the driving members D with respect to the stationary racks R, R–1, and R–2 as such racks become stationary. The pivotally mounted holding dogs 34 pivot freely rearwardly as they engage the stationary driving bars 24 of the forward racks R in the queue and allow continued movement of driving members D along the track 15.

Upon completion of the preceding immersion cycle, the solenoid 142 is actuated to its second operative position (FIG. 9), in a manner to be discussed below, raising the blocking arm 140c to allow the two forward racks R and R–1 in the queue to be reengaged by the continually moving driving members D and driven onto the movable portion 10w of the track 10. The blocking arm 140d is simultaneously lowered (FIG. 9) to engage the driving bar of the stationary rack R–2 and prevent movement of such rack, and any others thereafter in the queue, thereby limiting the number of racks driven onto the movable portion 10w to the desired two.

During movement of the racks R and R–1 onto the movable portion 10w the driving bars 24 of such racks R actuate arms 303a and 305a of switches 303 and 305.

During movement of the pair of racks R and R–1 onto the portion 10w, the switch 305 is actuated once by the driving bar 24 of the forward rack R, closing the contact 305b (FIG. 12A), energizing the counter 310a for one count, which causes the counter 310a to close the contacts 310c and 310d. Closure of the contact 310d permits energization of the relay 318, which opens contact 318a, deenergizing relay 91c of the solenoid 91, allowing the stop rod 91a to fall under the influence of gravity to a blocking position (FIG. 11) in the movable track section 10w of the track 10.

The foremost wheels 21 (FIG. 4) of the rack R engage the stop rod 91a, preventing further movement of such rack. The rack R–1 is moved into a position along the movable portion 10w where bumper 25 engages the bumper 25 of the forward rack R and the movable dog 83 is pivoted by the driving bar 24 of the rack R–1 to the position of FIG. 4, so that the racks R and R–1 are confined on the section 10w between the stop rod 91 and the dog 83 during the lowering and raising of such racks for the immersion thereof in the vat V.

When the racks immersed during the previous dipping cycle (not shown) moved away from the immersion means I by the driving conveyer system 15, the photoelectric circuit between photoelectric cell 306 and its associated reflective plate 306a was completed, and the contacts 306b were closed. Should one of the recently immersed racks remain in a position adjacent immersion means I, the photoelectric circuit is interrupted, preventing the contact 306b (FIG. 12A) from closing and thus precluding a complete electrical circuit for supplying electrical power to the immersion motor 90.

The level sensing means 111 is not actuated when the racks R are elevated (FIG. 4), and thus the contact 111a is closed, permitting energization of the immersion motor 90 in the circuit path between terminals 201f and 202f (FIG. 12A), which causes the immersion motor 90 to lower the movable portion 10w carrying the racks R into position where the wicks W are immersed in the vat V. The lowering movement caused by such operation of the immersion motor 90 continues until the level sensing means 111 actuates due to being in proximity to the float 43 (FIG. 5).

Actuation of the level sensing means 111 causes the switch 111a (FIG. 12A) to open, terminating the energization of the immersion motor 90, and ceasing lowering movement of the racks R and R-1, and also causes switch 111b to close, energizing the time delay relay 316. The time delay relay 316 operates only after passage of an interval of time, thus allowing the racks R and R-1 to remain in the vat V of molten wax for a time suitable to allow a portion of the molten wax 41 to adhere to the wicks W or the partially formed candles 105 on the wicks W.

After the short interval of immersion occurs, the time delay relay 316 actuates, closing the contacts 316a and 316b. Closing of the contact 316a energizes the immersion motor 90 in the circuit path between the terminals 201c and 202c, causing the immersion motor 90 to raise the movable portion 10w and racks R and R-1 from the immersion position (FIG. 5) to the normally aligned position (FIG. 4). When the position of normal alignment of the section 10w with the track 10 is reached, arm 304a of the switch 204 is actuated, causing contact 304c to open (FIG. 12A), terminating energization of the immersion motor 90, and causing the raising movement of the movable portion 10w to cease.

Closure of the contact 316b energizes the relay 318b which causes the contact 318a to close, energizing the relay 91c, which causes solenoid 91 to exert a lifting force on the stop bar 91a and removes such stop bar from the blocking position in the movable section 10w of the carrier conveyor system, thereby allowing the racks R and R-1, which were recently immersed, to be removed therefrom when the immersion motor 90 has elevated the racks to the position of normal alignment (FIG. 4).

Closure of contact 316a also energizes the relay 142d, which causes solenoid 142 to move to its first operative position, exerting a downward force on rod 142a, lowering the arm 140a of the escapement 140 while raising the arm 140b and allowing the racks R-2 and R-3 to be driven into position between the escapement arms 140a and 140b for the next immersion cycle. The driving bar 24 of the rack R-2 engages the dog 140c (FIG. 12) of the escapement 140 and is held stationary by such dog. The dogs 46 of the driving members D pass over the stationary driving bar 25 of the rack R-2 in the manner previously set forth. The rack R-3 is driven forwardly until its bumper 25 contacts the bumper 25 of the rack R-2, and rack R-3 is then also held stationary with respect to the driving conveyor system 15 (FIG. 12).

When the racks R-2 and R-3 are moved into position between the arms of the escapement 140, the driving bar of the rack R-2 actuates switch 302 by its arm 302a and closes contact 302b (FIG. 12) and the driving bar of the rack R-3 actuates switch 301 by its arm 301a and closes contact 301b.

When the movable track section 10w containing the racks R-1 and R-2 has been moved to its elevated position by the immersion motor 90 after the immersion cycle, the upper surface of the support member 81 acutates switch 304 by its arm 304a and closes contact 304b (FIG. 4).

The closed contacts 301b, 302b and 304b allow energization of relay 142c, which causes solenoid 142 to assume it first operative position exerting an upward force on the rod 142a, lowering the arm 140b and stopping any subsequent racks in the queue (not shown) from further movement by means of the dog 140d, and raising the arm 140a of the escapement 140, allowing the racks R-2 and R-3 to be driven into position on the movable track section 10w for the next immersion cycle.

During movement of each rack R onto the movable section 10w of the track 10 for immersion, the switch 303 is actuated by the driving bar 24 of each rack, and each actuation closes the contact 303b once, energizing the counter 310 for one count. The counter 310 thus registers a count of the total number of immersion cycles for the racks. After the count reaches a desired number, usually equal to the number of racks R on the track 10, indicating that each rack on such position has been immersed during that cycle, the counter 310, through a suitable control circuit (not shown), actuates the immersion depth adjusting means (FIG. 10) by energizing the assembly 115 to adjust for a deeper level of immersion for the next cycle, so that as the number of immersion cycles increases, the depth of insertion of the candle into the wax increases a very small amount, which causes production of a tapered candle.

After a suitable number of immersion cycles have formed an candle of desired size, the racks R containing completed candles being circulated along the track 10 may be switched by the switch S away from the track 10 onto track 10b leading away from the candle making apparatus A. New racks R with new wicks W are switched or positioned on the track 10 for repeating the foregoing operation.

It should be understood that although the immersion means I has been described and disclosed as immersing two racks of candles during each immersion cycle, the candle-making apparatus A of the present invention is equally adaptable for immersing one, three, or any suitable number of racks.

Also, the level sensing means could operate to sense the float 43 mechanically, acoustically, or by other suitable techniques.

Furthermore, the solenoids and actuating assemblies described and disclosed above can each be pneumatically, hydraulically, electrically, or mechanically actuated.

The foregoing disclosure and description of the invention are illustrative and explanatory thereof, and various changes in the size, shape, and materials as well as in the details of the illustrated construction may be made without departing from the spirit of the invention.

We claim:
1. An automatic candle making machine for forming a plurality of candles by sequentially and cyclically dipping at least one of a plurality of racks, containing wicks about which the candles are to be formed, into molten wax, comprising:
 (a) vat means for containing molten wax from which the candles are to be formed;
 (b) support means for the racks;
 (c) dipping means for cyclically moving said support means and the vat means relative to each other to dip the racks into the molten wax in said vat means;
 (d) sensor means for sensing the level of the molten wax when the racks have been inserted to a predetermined depth in the molten wax in said vat means;

(e) means responsive to said sensor means for stopping the relative movement of the racks into the wax at the predetermined depth in the wax; and (f) means for reversing the operation of said dipping means for removing the rack from the molten wax after dipping.

2. The machine of claim 1, further including:
means for adjusting the position of the sensing means with respect to said dipping means to thereby adjust the depth of dipping of the rack.

3. The machine of claim 1, wherein said support means includes:
means for limiting lateral movement of the rack with respect to said support means during the dipping thereof.

4. The machine of claim 1 further including:
means for periodically successively adjusting the position of said sensor means with respect to said dipping means to thereby successively increase the depth of immersion of the racks to form tapered candles on the wicks in the racks.

5. The machine of claim 1, wherein said dipping means comprises:
means for cyclically lowering said support means with respect to said vat means to dip the rack into the molten wax in said vat means.

6. The machine of claim 1, wherein said sensor means comprises:
(a) a body adapted to float substantially adjacent an upper surface of the molten wax in said vat means; and
(b) switch means for closing in response to proximity thereto of said body.

7. The machine of claim 1, further including:
time delay means responsive to said level sensing means for permitting the rack to remain in the vat of molten wax for a dipping interval, permitting the molten wax to coat the wicks.

8. An automatic candle making machine wherein candles are formed by dipping wicks in molten wax, comprising:
(a) vat means for containing molten wax;
(b) a plurality of racks, each of which has a plurality of wicks mounted thereon about which candles are to be formed by the molten wax;
(c) conveyor track means for moving said racks in a predetermined path relative to said vat means, said conveyor track means including a movable track section thereof having support means therewith for supporting said racks during dipping of the wicks;
(d) driving means for moving said plurality of racks on said conveyor track means;
(e) means for positioning a predetermined number of said plurality of racks on said movable track section over said vat means while said driving means continues to exert a driving force on the remainder of said plurality of racks;
(f) means for lowering said movable track section and said support means with said predetermined number of said racks from said conveyor track means into said vat means to dip the wicks while said remainder of said racks remain with said conveyor track means; and
(g) means for returning said movable track section with said predetermined number of said racks from said vat means to said conveyor track means.

9. The machine of claim 8, wherein said track section is movable downwardly relative to said conveyor track means to leave a gap in said conveyor track means during the dipping of the wicks and further including:
limit means for preventing said remainder of said plurality of racks from being moved into said gap in said conveyor track means.

10. The machine of claim 9 further including:
(a) means for controlling said lowering means comprising:
(1) means responsive to said limit means for actuating said lowering means;
(2) means for sensing the level of the molten wax to thereby insure said lowering means has properly inserted the wicks into the molten wax; and
(b) means for controlling said returning means comprising:
(1) means responsive to said level sensing means for actuating said returning means; and
(2) means responsive to said returning means for de-energizing said limit means.

11. The machine of claim 8, further including:
means for limiting lateral movement of said predetermined number of racks with respect to said movable track section during dipping of the wicks.

12. The machine of claim 8, wherein said conveyor track means comprises:
(a) carrier conveyor means for supporting said racks therebeneath independently of said driving means; and
(b) means for transmitting the drive force from said driving means to said racks to thereby apply a force to said racks to move same along said carrier conveyor means.

13. The machine of claim 8, wherein said driving means moves recently dipped ones of said plurality of racks away from said vat means after dipping therein, and further including:
(a) means for sensing the presence of recently dipped racks on said conveyor track means in a position adjacent said movable track section; and
(b) means responsive to said sensing means for preventing operation of said means for lowering until said recently dipped racks have been moved from the position adjacent said movable track section.

14. The machine of claim 6, wherein said sensor means comprises:
sleeve means for receiving said body therein.

15. The machine of claim 12, further including:
(a) counter means for counting the number of racks conveyed onto said movable track section; and
(b) means responsive to said counter means for operating said limit means to cause said remainder of said racks to form a queue awaiting dipping.

16. The machine of claim 15, including:
means for temporarily releasing transmission of the driving force to said remainder of said racks in the queue awaiting dipping.

17. A process of making candles by dipping wicks in molten wax, comprising the steps of:
(a) moving a plurality of racks, each of which has a plurality of wicks mounted thereon about which candles are to be formed by the molten wax, with a conveyor means in a predetermined path relative to a vat having molten wax therein;
(b) positioning at least one of the racks over the vat;
(c) lowering at least one of the racks into the vat while another of the racks remains on the conveyor means;
(d) sensing the level of the molten wax to insure that the rack being lowered is inserted the desired amount into the vat of molten wax;
(e) coating the wicks on the lowered rack with molten wax;
(f) raising the lowered rack from the vat;
(g) thereafter moving the rack in said predetermined path of the conveyor means away from the vat; and
(h) solidifying the coating of molten wax during movement of the racks along the predetermined path.

18. The process of claim 17, including the step of:
adjusting the depth of lowering of the rack after all of the racks have been lowered and raised at least one time to control the shape of the candles being formed.

19. The process of claim 17, including the step of: limiting to a predetermined number the racks being lowered at one time, by controlling the number of the racks to be positioned above the vat of molten wax.

References Cited

UNITED STATES PATENTS

| | | | |
|---|---|---|---|
| 3,256,567 | 6/1966 | Bjorck | 18—24 |
| 2,478,202 | 8/1949 | Moore | 18—27 |
| 2,996,761 | 8/1961 | Bank et al. | 18—24 |
| 2,529,829 | 11/1950 | Bank | 18—24 |
| 1,906,444 | 5/1933 | Bixby | 18—24 |
| 2,827,663 | 3/1958 | Flomp | 18—24 |
| 2,688,157 | 9/1954 | Schroeder | 18—24 |
| 3,278,991 | 10/1966 | Peternell et al. | 18—24 |
| 2,812,269 | 11/1957 | Ransburg | 117—113 X |
| 3,117,341 | 1/1964 | Abildgaard et al. | 18—24 X |

WILLIAM D. MARTIN, Primary Examiner

M. R. LUSIGNAN, Assistant Examiner

U.S. Cl. X.R.

18—24, 27; 117—66, 113